July 12, 1932.  C. J. ESSELING  1,867,257
POWER TAKE-OFF
Filed Aug. 18, 1930   2 Sheets-Sheet 1
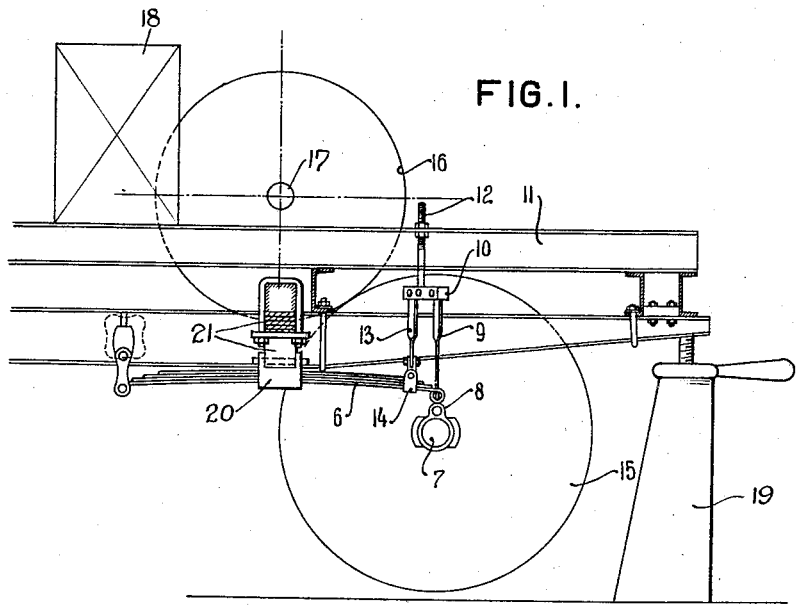
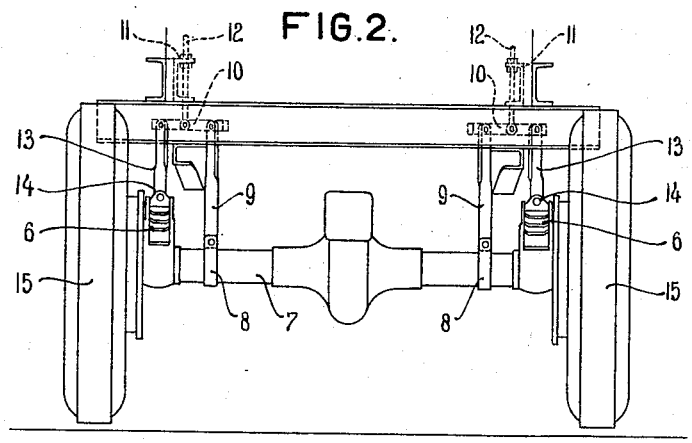
C. J. Esseling
INVENTOR
By: Marks & Clerc
ATTYS.

July 12, 1932. C. J. ESSELING 1,867,257
POWER TAKE-OFF
Filed Aug. 18, 1930  2 Sheets-Sheet 2
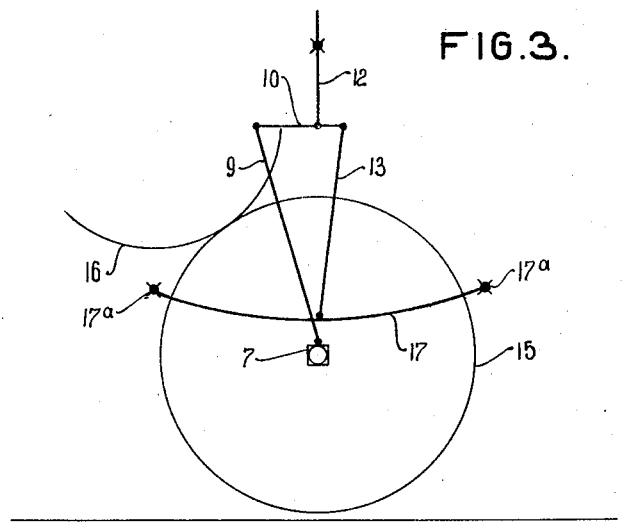
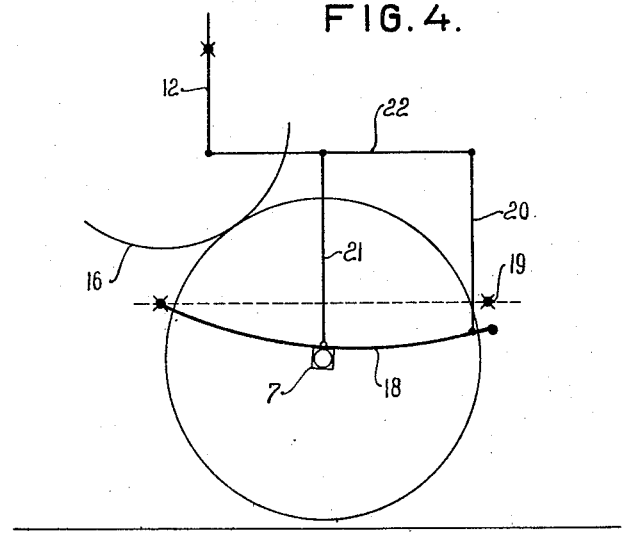
C. J. Esseling
INVENTOR
By Marks & Clerk
ATTYS.

Patented July 12, 1932

1,867,257

UNITED STATES PATENT OFFICE

CORNELIS J. ESSELING, OF HAARLEM, NETHERLANDS

POWER TAKE-OFF

Application filed August 18, 1930, Serial No. 476,144, and in the Netherlands July 10, 1930.

My copending application for Patent No. 450,838, filed May 8, 1930, discloses a motor truck having a driven wheeled rear axle, a tool mounted on the truck, a drive shaft for said tool mounted on the truck in parallel relation with the rear axle, friction wheels on the drive shaft substantially in the planes passing through the wheels on the rear axle, and means for bringing the wheels on the rear axle into operative engagement with the friction wheels.

My present invention, which relates to certain improvements of my said earlier construction, resides therein that the suspension springs of the drive axle, after being detached from said axle, or from a spring shackle, are used, through the medium of elevating mechanism, for pulling the axle upwards as soon as they are tensioned, so that they act to press the drive wheels against the friction wheels. The tool on the truck can be thrown out by means of a hand lever, by the clutch of the motor, or by any other suitable means. The pressure between the drive wheels and the friction wheels can easily be limited to a predetermined maximum value, so that the motor can not be overloaded.

The novel construction has the additional advantage that the suspension springs of the truck are adapted to move the drive wheels through a comparatively great distance, so that also the friction wheels of the tool may be provided with pneumatic tires. Should the pneumatic tires not be sufficiently inflated, the spring pressure and, consequently, the maximum friction moment will be reduced, so that the tires will not be subjected to excessive wear.

If, as will ordinarily be the case, the tool will have to remain in operation during a long time, the time required for disconnecting the suspension springs and attaching the reverting mechanism can be neglected.

The drawings illustrate three embodiments of my invention.

Fig. 1 is a part side elevational view of a motor truck in accordance with my invention, Fig. 2 is a rear elevational view thereof, Figs. 3 and 4 are diagrams showing two other methods for using the suspension springs of the drive axle to press the drive wheels against the friction wheels of the tool.

In accordance with Figs. 1 and 2, the rear ends of the suspension springs 6 have been disconnected from the rear or drive axle 7 of the motor truck. Clamped on the rear axle 7 are straps 8 secured to rods 9, the top ends of which are pivotally connected to levers 10. Said levers are suspended from the longitudinal beams 11 of the motor truck frame by means of vertically adjustable eye bolts 12. At their other ends, the levers 10 are pivoted to connecting rods 13 which, in turn, are pivotally associated with straps 14 temporarily clamped to the suspension springs 6.

The drive wheels 15 as shown are clear of the ground, due to the frame of the truck being lifted by a screw jack 19 or the like. Wheels 15 which drive the shaft 17 are in frictional engagement with the friction wheels 16 by means of which a tool 18 mounted upon the truck can be driven. The pressure exerted by wheels 15, 16 upon one another is brought about by the springs 6 through the medium of the reversing levers 10, it being understood that springs 6 are suitably tensioned by adjustment of the eye bolts 12.

The arms of each lever 10 have unequal lengths, and the pressure between wheels 15 and 16 is determined by the position of the eye-bolt 12. For a given position of this eye-bolt, however, the pressure is determined by the ratio between the lengths of the arms of said lever.

The springs 6 have clamps 20 secured intermediate their ends, to which the ends of the transverse spring 21, are connected, as customary.

In accordance with Fig. 3, the suspension spring 17 need not be disconnected from its shackles 17a, but in this case it should be detached from the rear axle 7. Otherwise, this device operates exactly as the one shown in Figs. 1–2.

Fig. 4 illustrates an arrangement in which the suspension spring 18 is disconnected from its rear shackle 19. Evidently, rod 20 is under strain of compression and rod 21 under strain of tension. The end of reversing lever 22 is suspended from eye bolt 12. Otherwise the operation of this mechanism does not differ essentially from that of the devices illustrated in Figs. 1, 2 and 3.

What I claim is:—

1. The combination with a truck and its motor driven rear axle, of a tool axle on the truck, tool driving wheels on the tool axle, springs detachably connecting the frame of the truck and rear axle, levers connected with the truck frame, rods connected to the ends of the levers, straps carried by the springs and axle, said rods being adapted to unite the straps of the axle and springs when the springs are detached from the axle, said levers being operable to flex the springs and lift the axle to move the wheels thereof into engagement with the tool driving wheels.

2. The combination with a truck and its motor driven rear wheeled axle, of tool driving wheels on the truck frame, bolts detachably connected to the frame of the truck for vertical movement, levers connected with the bolts, rods connected to the ends of the levers, springs detachably connecting the frame and rear axle, means for connecting the rods respectively to the springs and rear axle when the springs are disengaged from the rear axles, whereby vertical adjustment of the bolts will flex the springs and elevate the axle to move the wheels of the axle into driving engagement with the tool driving wheels.

In testimony whereof I affix my signature.

CORNELIS J. ESSELING.